United States Patent [19]
Nussbaumer

[11] 3,906,218
[45] Sept. 16, 1975

[54] DIGITAL FILTERS

[75] Inventor: Henri J. Nussbaumer, La Gaude, France

[73] Assignee: International Business Machines Corporation, Armonk, N.Y.

[22] Filed: Dec. 3, 1974

[21] Appl. No.: 529,170

[30] Foreign Application Priority Data

Dec. 28, 1973 France .............................. 73.47206

[52] U.S. Cl. .................... 235/156; 328/167; 333/18
[51] Int. Cl.[2] ........................ G06F 7/38; G06F 15/34
[58] Field of Search .................... 235/156, 152, 168; 328/167, 165; 333/18, 28, 70 T

[56] References Cited

UNITED STATES PATENTS 3,737,636 6/1973 Esteban .............................. 235/152
3,777,130 12/1973 Croisier et al. ...................... 235/152
3,822,404 7/1974 Croisier et al. ................. 235/152 X

*Primary Examiner*—Joseph F. Ruggiero
*Attorney, Agent, or Firm*—Delbert C. Thomas

[57] ABSTRACT

A redesigned digital filter is disclosed which uses fewer of the costly multiplier components than conventional digital filters. Samples of the input signals are processed alternately using a multiplier common to two successive samples and a correction term is generated using successive pairs of input samples. The generation of the correction term requires fewer than one-half of the multiplier circuits used in a conventional filter so that the overall circuit saves about one-fourth of the multipliers usually needed.

3 Claims, 3 Drawing Figures

DIGITAL FILTERS

OBJECTS OF THE INVENTION

This invention relates to digital filtering devices,

A digital filter is a device which uses samples of an input signal $x$ to generate samples of an output signal $y$, that is, a signal the spectrum of which only contains those frequencies which the filter will pass. If we call $x_i$ the sample at instant i of signal $x$, and $x_{i-1}, x_{i-2}, \ldots, x_{i-k}$ the first, second, . . . , $k^{th}$ samples preceding $x_i$, respectively, sample $y_i$ of output signal $y$ can be obtained by performing the operation written as $$y_i = \sum_{k=1}^{n} a_k \cdot x_{1-k} \qquad (1)$$

This operation means that $y_i$ is obtained by weighting each of the input samples between $x_{i-1}$ and $x_{i-n}$ with a constant coefficient $a_1$—$a_n$, and by then adding together the weighted samples. A filter capable of performing this operation is referred to as an $n$ coefficient transversal filter. However, sample $y_i$ can also be obtained by using the preceding samples $y_{i-1}, y_{i-2}, \ldots$, and by processing these in the same manner as the samples $x_{i-k}$ of expression (1), in which case $y_i$ is derived from the expression:

$$y_1 = \sum_{1}^{p} a_k \cdot x_{1-k} + \sum_{1}^{q} b_k \cdot y_{1-k} \qquad (2)$$

A filter capable of performing this latter operation is called a recursive filter and will have n coefficients if $p + q = n$.

Although as has been mentioned above that $x_{i-k}$ denotes the $k^{th}$ sample preeeding $x_i$, any other sample could be so designated since the filtering function can be accomplished either by repeating or by skipping samples of the input signal $x$.

In order for the filter to derive $y_i$ from either of expressions (1) and (2), n multiplications are required. Accordingly, the filter would have to include either a set of n multipliers or a computation stage capable of performing n multiplications for each sample of output signal $y$ within a given time interval, both of which arrangements are costly and entail a severe limitation of the capabilities of the filter. It would, therefore, be desirable to minimize the number of multipliers required to provide $y_i$. In the past, various solutions to this problem have been proposed. Some of these consist in completely eliminating the multiplications required to form every sample of $y$ by using a memory in which the partial results of the multiplications are stored beforehand. However, the use of such a sophisticated scheme is not warranted in most applications. Other solutions which have been proposed to reduce the number of multiplications call for a rearrangement of the filtering operations. The present invention falls into the latter class of solutions.

It will be observed that, as far as the above problem is concerned, either of expressions (1) and (2) may be used. In both cases, a sum of weighted samples of electrical signals must be formed. Consequently, what follows will be applicable both to the transversal and to the recursive types of filter. For simplicity, the invention will be described using expression (1):

$$y_i = \sum_{k=1}^{n} a_k \cdot x_{1-k}$$

It is the object of the present invention to provide an improved digital filter wherein each sample $y_i$ of the filtered signal is obtained using a first means for forming a main term resulting from the addition of products of two terms, one of which is a sum of samples of the input signal $x$, the other being a sum of coefficients of the $a$ form, and a second means for algebraically adding a corrective term to the result supplied by said first means.

The foregoing and other objects, features and advantages of the invention will be apparent from the following more particular description of a preferred embodiment of the invention, as illustrated in the accompanying drawings.

Figure 1:
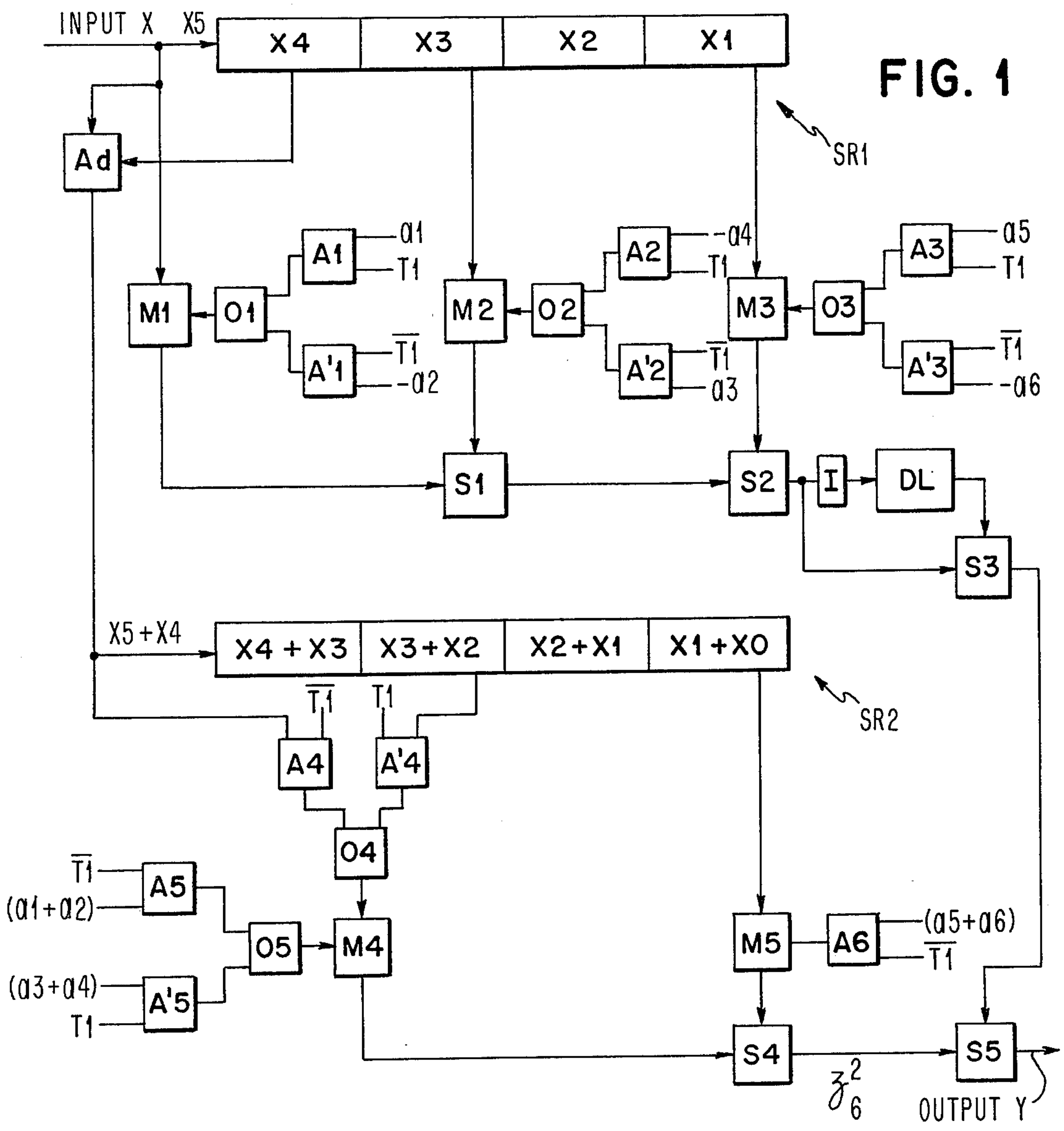
FIG. 1 is a schematic diagram illustrating an embodiment of the invention.
Figure 1A:
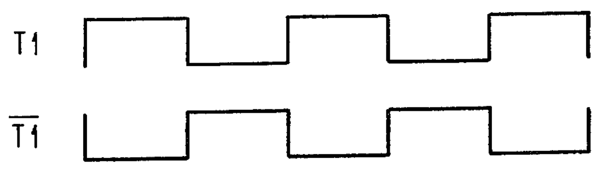
FIG. 1A shows waveforms illustrating the operation of clock signal T1.

The expression $$y_1 = \sum_{1}^{n} a_k \, x_{i-k}$$

can be modified by separating the part thereof whose terms are obtained by giving k an odd value from that part whose terms are obtained by giving k an even value, the two parts being designated $y_i^1$ and $y_i^2$, respectively. Thus, $$y_1 = y_i^1 + y_i^2$$

Therefore, $$y_i^1 = \sum_{p=1}^{n/2} a_{2p-1} \cdot x_{i-2p+1}. \qquad (3)$$

$$y_i^2 = \sum_{p=1}^{n/2} a_{2p} \cdot x_{i-2p}. \qquad (4)$$

If the main term $z_i$ is defined by $$z_i = \sum_{p=1}^{n/2} (a_{2p-1} + a_{2p}) \, (x_{i\ 2p+1} + x_{i-2p}) \qquad (5)$$

we may also write $$z_i = z_i^1 + z_i^2 \qquad 6$$

noting that $z_i^1$ is that part of $z_i$ wherein p has an odd value, namely, $p=2q+1$, and that $z_i^2$ is that part of $z_i$ wherein $p$ has an even value, namely $p=2q$.

Therefore, if $n/4$ is an integer,

-Continued $$z_i^1 = \sum_{q=0}^{(n-4)/4} (a_{4q+1} + a_{4q+2})(x_{i-4q-1} + x_{i-4q-2}) \quad (7)$$

$$z_i^2 = \sum_{q=1}^{n/4} (a_{4q-1} + a_{4q})(x_{i-4q+1} + x_{i-4q}) \quad (8)$$

each of which latter expressions requires n/4 multiplications.

Expressions (3) and (4) can be modified to bring out parameter $q$. We thus obtain $$y_i^1 = \sum_{q=0}^{(n-4)/4} a_{4q+1} \cdot x_{i-4q-1} + \sum_{q=1}^{n/4} a_{4q-1} \cdot x_{i-4q+1},$$

by successively letting $p=2q+1$ and then $p=2q$ in expression (3). Making similar changes in expression (4), we obtain:

$$y_i^2 = \sum_{q=0}^{(n-4)/4} a_{4q+1} \cdot x_{i-4q-2} + \sum_{q=1}^{n/4} a_{4q} \cdot x_{i-4q}$$

be demonstrated that this result will be achieved by means of a suitable selection of the terms of the $z_i$ and $y_i$ forms.

Expressions (7) and (8) may be used alternatively since $$y_i = \sum_{q=0}^{(n-4)/4} [a_{4q+1} \cdot x_{i-4q-1} + a_{4q+2} \cdot x_{i-4q-2}] + \sum_{q=1}^{n/4} [a_{4q-1} \cdot x_{i-4q+1} + a_{4q} \cdot x_{i-4q}].$$

$$y_{i+1} = \sum_{q=0}^{(n-4)/4} [a_{4q+1} \cdot x_{i-4q} + a_{4q+2} \cdot x_{i-4q-1}] + \sum_{q=1}^{n/4} [a_{4q-1} \cdot x_{i-4q+2} + a_{4q} \cdot x_{i-4q+1}].$$

$$y_{i+2} = \sum_{q=0}^{(n-4)/4} [a_{4q+1} \cdot x_{i-4q+1} + a_{4q+2} \cdot x_{i-4q}] + \sum_{q=1}^{n/4} [a_{4q-1} \cdot x_{i-4q+3} + a_{4q} \cdot x_{i-4q+2}].$$

and so on for the next terms y.

The above expressions can also be written $$y_i = z_i^2 + \sum_{q=0}^{(n-4)/4} [a_{4q+1} \cdot x_{i-4q-1} + a_{4q+2} \cdot x_{i-4q-2}] - \sum_{q=1}^{n/4} [a_{4q-1} \cdot x_{i-4q} + a_{4q} \cdot x_{i-4q+1}] \quad (9)$$

$$y_{i+1} = z_{i+1}^1 = \sum_{q=0}^{(n/4)/4} [a_{4q+1} \cdot x_{i-4q-1} + a_{4q+2} \cdot x_{i-4q}] + \sum_{q=1}^{n/4} [a_{4q-1} \cdot x_{i-4q+2} + a_{4q} \cdot x_{i-4q+1}] \quad (10)$$

$$y_{i+2} = z_{i+2}^2 + \sum_{q=0}^{(n-4)/4} [a_{4q+1} \cdot x_{i-4q+1} + a_{4q+2} \cdot x_{i-4q}] - \sum_{q=1}^{n/4} [a_{4q-1} \cdot x_{i-4q+2} + a_{4q} \cdot x_{i-4q+3}] \quad (11)$$

hence, $$y_i = \sum_{q=0}^{(n-4)/4} [a_{4q+1} \cdot x_{i-4q-1} + a_{4q+2} \cdot x_{i-4q-2}] + \sum_{q=1}^{n/4} [a_{4q-1} \cdot x_{i-4q+1} + a_{4q} \cdot x_{i-4q}]$$

Expression (5) permits to reduce by half the number of multiplications required to obtain $y_i$, but introduces unwanted terms which must be eliminated. This necessitates the use of a corrective term. In order for this approach to be worth using, the total number of multiplications required to obtain $y_i$ must be less than $n$. It can Thus, the determination of each sample of $y$ necessitates the computation of terms used to form the next sample of $y$, which permits reducing the number of multiplications required. Accordingly, the total number of multiplications required will be $$\frac{n}{4} + \frac{n}{4} + \frac{n}{4} = \frac{3n}{4}$$

instead of n for a conventional filter.

Obviously, the reduction in the number of multiplications is proportional to the value of n. Note, that if $n/4$ is not an integer, but $n/4-1/2$ is an integer, all the upper limits of the sums that permit calculating $z_i^1$, $z_i^2$, $y_i^1$ and $y_i^2$ can be made equal to $n/4-1/2$. In that case, the computation of $z_i^1$ will require $n/4-½+1$ multiplications while that of $z_i^2$ will require $n/4-½$ multiplications, and the total number of multiplications required will still average $3n/4$.

In actual practice, it is by no means uncommon for the value of n to be the order of 100. However, for the purposes of the present description, it will be assumed that $n=6$. If so, expressions (7) and (8) become respectively $$z_i^1 = (a_1 + a_2)\ (x_{i-1} + x_{i-2}) + (a_5 + a_6)\ (x_{i-5} + x_{i-6}).$$

$$z_i^2 = (a_3 + a_4)\ (x_{i-3} + x_{i-4}).$$

Expressions (9) to (11) then become $$y_i = (a_3 + a_4)\ (x_{i-3} + x_{i-4}) + (a_1x_{i-1} + a_5x_{i-5} + a_2x_{i-2} + a_6x_{i-6}) - (a_3x_{i-4} + a_4x_{i-3})$$

$$y_{i+1} = (a_1 + a_2)\ (x_i + x_{i-1}) + (a_5 + a_6)\ (x_{i-5} + x_{i-4}) - (a_1x_{i-1} + a_5x_{i-5} + a_2x_i + a_6x_{i-4}) + (a_3x_{i-2} + a_4x_{i-3})$$

$$y_{i+2} = (a_3 + a_4)\ (x_{i-1} + x_{i-2}) + (a_1x_{i+1} + a_5x_{i-3} + a_2x_i + a_6x_{i-4}) - (a_3x_{i-2} + a_4x_{i-1})$$

Referring now to FIG. 1, an embodiment of the digital filter of the present invention is shown by way of example. This filter has six coefficients ($n = 6$). The samples of the input signal $x$ are fed into a delay line SR1. The latter can only store four samples of $x$, namely $x_1$, $x_2$, $x_3$ and $x_4$, at instant $i = 6$ during which the filter is to form output signal sample $y_6$. At that instant, the last sample which appears at the input X of the filter is sample $x_5$.

Delay line SR1 is provided with three equidistant taps respectively located at the input, in the middle and at the output thereof. As shown, the first of these taps is connected to one of the inputs of a multiplier $M_1$; similarly, the other two taps are respectively connected to one of the inputs of two multipliers, $M_2$ and $M_3$. The second input of $M_1$ receives either the coefficient $a_1$ through an AND gate A1, which is activated when the signal T1 is at a logical 1 level (T1=1), and an OR circuit O1, or the coefficient $-a_2$ through an AND gate A'1, which is activated when T1=0 (or when $\overline{T1}$=1), and OR O1. Similarly, multiplier $M_2$ receives either the coefficient $-a_4$ through an AND gate A2 and an OR circuit O2 when T1=1, or the coefficient $a_3$ through an AND gate A'2 and OR O2 when T1=1, while multiplier $M_3$ receives either the coefficient $a_5$ through an AND gate A3 and an OR circuit O3 when T1=1, or the coefficient $-a_6$ through an AND gate A'3 and OR O3 when $\overline{T1}$=1. The outputs from the multipliers $M_1$, $M_2$, and $M_3$ are added together in adders S1 and S2. The result of the latter operation is sent to a third adder, S3, both directly or via an inverter I and a delay line DL which can store one sample.

The object of the part of the filter which has just been described (i.e., from input X to the output of S3) is to form the corrective term which, when added to the main term of the $z$ form, will provide the desired sample of output signal $y$.

The filter further includes an adder Ad which forms the algebraic sum of the input signal and the last sample stored in SR1, namely $x_5+x_4$. This sum is then fed into a second delay line SR2 which, in this example, can store up to four of the sums provided by adder $Ad$. The sum $x_5+x_4$ is also fed to one of the inputs of a multiplier $M_4$ through an AND gate A4, which is activated when $\overline{T1}$=1, and an OR circuit O4. When T1=1, $M_4$ receives the second sum stored in SR2 (starting from the input thereof) through an AND gate A'4 and OR O4. The second input of $M_4$ receives either constant $(a_1+a_2)$ when $\overline{T1}$=1, or constant $(a_3+a_4)$ when T1=1. The output from SR2 is fed to one of the inputs of a multiplier $M_5$, the other input of which receives constant $(a_5+a_6)$ through an AND gate A6 when $\overline{T1}$=1. The outputs from $M_4$ and $M_5$ are added together in an adder S4 to provide the main term.

Adding the main term to the corrective term in adder S5 will result in the desired sample of $y$ being obtained at the output Y of the filter.

In operation, $(x_5+x_4)$ is fed at instant $i+6$ to the input of SR2 which already contains the words resulting from the preceding operations, namely, $(x_4+x_3)$, $(x_3+x_2)$, $(x_2+x_1)$ and $(x_1+x_0)$. At that instant, T1=1 and therefore $M_4$ provides the term $z_6^2 = (a_3+a_4)\ (x_3+x_2)$.

Multipliers $M_1$, $M_2$ and $M_3$ provide $a_1x_5$, $-a_4x_3$ and $a_5x_1$, respectively. Adder S2 consequently forms the word $a_1x_5-a_4x_3+a_5x_1$. The output of delay line DL at this time is the inverted result of the operation performed at the time $y_5$ was formed, namely, $+a_2x_4-a_3x_2+a_6x_0$.

The corrective term formed by S3 is then $a_1x_5-a_4x_3+a_5x_1+a_2x_4-a_3x_2+a_6x_0$. Adding this term to $z_6^2$ in adder S5 yields $$y_6 = (a_3+a_4)\ (x_3+x_2) + a_1x_5+a_2x_4-a_4x_3-a_3x_2+a_5x_1+a_6x_0 = a_1x_5+a_2x_4+a_3x_3+a_4x_2+a_5x_1+a_6x_0.$$

At the next instant, i=7, signal T1=1 and the circuitry that forms $z$ provides $$z_7^1 = (a_1+a_2)\ (x_5+x_6) + (a_5+a_6)\ (x_2+x_1).$$

The corrective term provided by S3 is $$-a_2x_6 - a_1x_5 + a_3x_4 + a_4x_3 - a_6x_2 - a_5x_1$$

The sample of $y$ obtained at the output of S5 is $$y_7 = (a_1+a_2)\ (x_5+x_6) + (a_5+a_6)\ (x_1+x_2) - a_2x_6 - a_1x_5 + a_4x_3 - a_6x_2 - a_5x_1$$
$$= a_1x_6 + a_2x_5 + a_3x_4 + a_4x_3 + a_5x_2 + a_6x_1$$

The process described above is repeated to successively provide the other samples of $y$.

FIG. 1 shows that only one out of every two words contained in delay lines (or shift registers) SR1 and SR2 is actually used at each instant T1 or $\overline{\textbf{T1}}$. The invention is therefore also useful in those applications where it is desired to process two different signals using a single filter, in which case samples of each signal should alternatively be fed into SR1 in accordance with the principles of the multiplexing technique. However, it would be feasible to alternatively use the respective coefficients of two filters together with the scheme of the present invention to simultaneously provide two signals, Y and W, derived from the same signal X. Regardless of the type of application involved, the total number of multipliers required is equal to the number of multipliers being used when T1=1 plus the number of multipliers being used when $\overline{T1}$=1.

Figure 2:
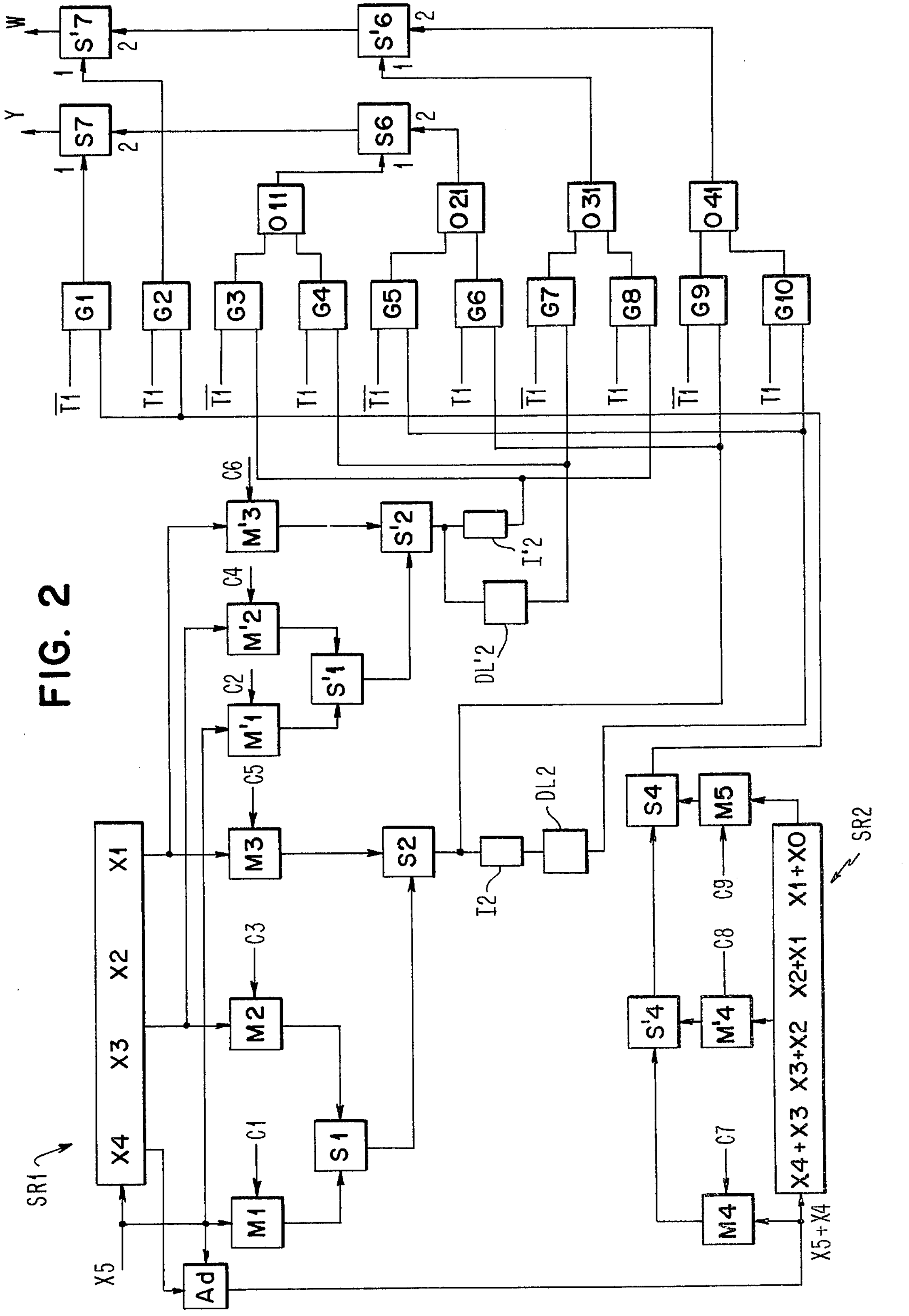
FIG. 2 illustrates another embodiment of the invention.

FIG. 2 illustrates an embodiment of the invention intended to process the same input signal $x$ using two different filtering functions. This device, therefore, provides two filtered output signals Y and W. As in the case of the FIG. 1 embodiment, the samples of $x$ are fed into a delay line SR1 and the sum of the last two consecutive samples are provided by an adder Ad and fed into a delay line SR2. SR1 is provided with the three taps previously described. However, these taps are connected not only to a first set of multipliers $M_1$–$M_3$ (see FIG. 1), but also to a second set of multipliers $M_1'$, $M_2'$ and $M_3'$. The outputs from the first set are added together in adders S1 and S2, while those from the second set ara added together in two additional adders, S'1 and S'2. The output of S'2 is connected to the respective inputs of an inverter 1'2 and a delay line DL'2, which can store one word. The output of 1'2 is connected to one of the inputs of an adder S6 through a gate G3, which is activated when $\overline{T1}$=1, and an OR circuit O11, and also to one of the inputs of an adder S'6 through a gate G8, which is activated when T1=1, and an OR circuit O31. The output of S2 is connected to the second input of S6 through a gate G6, which is activated when T1=1, and an OR circuit O21; to the second input of S'6 through a gate G9, which is activated when $\overline{T1}$=1, and an OR circuit O41; and to the input of an inverter I2, the output of which is connected to the input of a delay line DL2 having a storage capacity of one word. The output of DL2 is connected to the second input of S6 through a gate G5, which opens when $\overline{T1}$=1, and OR circuit O21, and also to the second input of S'6 through a gate G10, which opens when T1=1, and OR circuit 041

A multiplier, $M'_4$, additional to multipliers $M_4$ and $M_5$ as set out with respect to FIG. 1, is provided to form the term $z$. The output from $M'_4$ is added to the outputs from $M_4$ and $M_5$ by an additional adder, S'4. The output of the final adder S4 is connected to one of the inputs of an adder S7 through a gate G1 which is activated when $\overline{T1}$=1, and also to the first input an adder S'7 through a gate G2 which is activated when T1=1. The outputs of S6 and S'6 are connected to the second inputs of S7 and S'7, respectively. The outputs from S7 and S'7 provide the samples of output signals Y and W, respectively.

The coefficients corresponding to the first and second filtering operations will be designated $a_1$ to $a_6$ and $b_1$ to $b_6$, respectively. These coefficients will be applied to the inputs $c_1$ to $c_9$ of the multipliers in accordance with sequences to be defined later.

From the equations already given, we may derive:

$$y_1 = y_i^1 + y_i^2$$

$$z_i = y_i + y_{i+1}^2 + y_{i-1}^1.$$

We may therefore write:

| Time | | |
|---|---|---|
| $i$ | $y_i = y_i^1 + y_i^2$ | $W_i = z_i^{(w)} - W_{i+1}^2 - W_{i-1}^1$ |
| $i+1$ | $Y_{i+1} = z_{i+1}^{(y)} - Y_{i+2}^2 - Y_i^1$ | $W_{i+1} = W_{i+1}^1 + W_{i+1}^2$ |
| $i+2$ | $Y_{i+2} = Y_{i+2}^1 + Y_{i+2}^2$ | $W_{i+2} = z_{i+2}^{(w)} - W_{i+3}^2 - W_{i+1}^1$ |
| $i+3$ | $z_{i+3}^{(y)} - Y_{i+4}^2 - Y_{i+2}^1$ | $W_{i+3} = W_{i+2}^1 + W_{i+3}^2$ |
| | etc., | |

where $z^{(w)}$ and $z^{(y)}$ represent the main terms associated with filter $w$ and filter $y$, respectively.

The process then continues in the manner previously described.

It will be seen that the part of the device which forms $z$ is alternatively necessary to the function Y and to the function W, and will alternatively form $z^{(y)}$ using coefficients $a$, then $z^{(w)}$ using coefficients $b$. Similarly, those parts of the device which form the even-coefficient and the odd-coefficient elements of the corrective term are alternatively necessary to Y and W, provided that the terms so formed are stored until the next sample is formed.

The following table shows the distribution in time of the coefficients and of the information provided by adders S'2 and S2.

| Time | $c_1$ | $c_3$ | $c_5$ | $c_2$ | $c_4$ | $c_6$ | $c_7$ | $c_8$ | $c_9$ | S2 | S'2 | S4 |
|---|---|---|---|---|---|---|---|---|---|---|---|---|
| $i$ | $a_1$ | $a_3$ | $a_5$ | $b_2$ | $b_4$ | $b_6$ | $(b_1+b_2)$ | $(b_3+b_4)$ | $(b_5+b_6)$ | $Y_i^1$ | $W_{i+1}^2$ | $z_i^{(w)}$ |
| $i+1$ | $b_1$ | $b_3$ | $b_5$ | $a_2$ | $a_4$ | $a_6$ | $a_1+a_2$ | $a_3+a_4$ | $a_5+a_6$ | $W_{i+1}^1$ | $Y_{i+2}^2$ | $z_{i+1}^{(y)}$ |
| $i+2$ | $a_1$ | $a_3$ | $a_5$ | $b_2$ | $b_4$ | $b_6$ | $b_1+b_2$ | $b_3+b_4$ | $b_5+b_6$ | $Y_{i+2}^1$ | $W_{i+3}^2$ | $z_{i+2}^{(w)}$ |
| $i+3$ | $b_1$ | $b_3$ | $b_5$ | $a_2$ | $a_4$ | $a_6$ | $a_1+a_2$ | $a_3+a_4$ | $a_5+a_6$ | $W_{i+3}^1$ | $Y_{i+4}^2$ | $z_{i+3}^{(y)}$ |

For example, at instant i+1, sample $Y_{1+1}$ is formed in the following manner: the output from S'2 is inverted by 1'2, which gives $-Y_{1+2}^2$; this is sent to the first input of S6 by letting $\overline{T1}$=1; the content of DL2, namely, $-y_i^1$, is sent to the second input of S6 which then applies $-y_{i+2}^2 - y_i^1$ to the second input of S7, the first input of which receives $z_{i+1}^{(y)}$. Adder S7 therefore provides $$Y_{i+1} = z_{i+1}^{(y)} - Y_{i+2}^2 - Y_i^1.$$

Meanwhile, the output from DL'2, namely, $W_{i+1}^2$, is sent to the first input of S'6, the second input of which receives the output from S2, namely, $W_{i+1}^1$. The output from S'6, namely, $W_{i+1}$, passes on through S'7 unchanged since the first input of S'7 is at a logical zero level.

It will thus be seen that, if one desires to process a single signal using a bank of N filters with n coefficients, the present invention will permit saving a total of $Nn/4$ multipliers.

The embodiments of the invention as above, broadly described, may be formed into either an analog or a digital version as required. For the analog version, the delay lines SR1 and SR2 would be the well-known delay line in either the distributed impedance or lumped impedance types or movable storage devices having a longer delay such as magnetic records. Suitable readout devices as conventional taps or read heads would be provided to provide delayed signal outputs as needed.

Multipliers for analog signals are conventionally potentiometers having an input signal applied to one end of the resistance element and a product signal taken off at the movable contact. Adding circuits will generally be the well-known Kirchhoff type and inverters can be designed using the known input-output relationship of amplifying circuits.

Many other types of analog devices are known to perform the above noted functions and it is to be understood that the above comments are exemplary only and are not to be considered as limiting the scope of the invention.

For a digital version, each sample of the signals to be processed will be represented as a group of binary signals and all signals of a group must be treated as a unitary quantity. In such a digital embodiment, each of the signal lines of the drawings will comprise a signal bus having one conductor for each binary bit in the representation of the sample. The shift registers will have a like plurality of bit shift registers in parallel to store the sample bits. The multipliers in the digital form are made with plural circuits on the inputs and outputs to receive multibit operands and to generate the multibit output. Adding circuits are well-known for plural bit inputs and provide outputs having similar bit size values. The inverters shown will convert a binary value to its two's complement value by changing each input bit to its inverse and then adding a one bit to the inverse term.

Representative ones of these digital type circuits may be found in the book "Arithmetic Operations in Digital Computers," by R. K. Richards, published in 1955 by D. VanNostrand Co., with a Library of Congress Catalog Card No. 55–6234. Shift registers are described on pages 144–148 of this book. A multiplier circuit is shown at page 139 and a usable adder is described at pages 111 to 113.

Other representative circuits using more recently developed types of circuits are set out in the book "Manual of Logic Circuits," by Gerald A. Maley. This book was printed in 1970 by Prentice-Hall and has a Library of Congress Catalog No. 74–113716. Shift register circuits are set out on pages 204 to 209 and on pages 266 to 275. Adding circuits are described on pages 61 to 65, on pages 171 and 172 and on pages 235 to 239. Such adder circuits are also usable in multipliers when connected together as set out in the Richards' book and are also used in inverter circuits to add the bit in the lowest order when a complement is formed.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. An electrical filter of the sampling type wherein each output signal sample is derived from a plurality of weighted earlier input signal samples, said filter characterized by having:

a. a first means for forming a main term, said first means including:
   i. summing means for adding the value of each input signal sample to that of the preceding input signal sample;
   ii. storage means for temporarily storing at least the last n sums provided by said summing means;
   iii. readout means for providing the value of every second sum temporarily stored by said storage means;
   iv. means for weighting every second sum provided by said readout means, by alternatively using the sums of even order to form a first output sample and the sums of odd order to form a second output sample; and
   v. means for adding together the sums weighted by said weighting means and associated with the output signal sample being derived;

b. a second means for forming a corrective term, including:
   i. a second storage means for temporarily storing the last n signal samples applied to the input of said filter;
   ii. another means for providing the value of every second sample temporarily stored in said second storage;
   iii. product means for weighting the values of the samples provided by said another means, by alternately using a first set of coefficients selected from the coefficients of the filter to be realized while forming a third output signal sample and a second set of coefficients while forming the fourth output sample;
   iv. adder means for adding together the samples weighted by said product means while forming each output signal sample;
   v. a last storage means for storing the result of the operation performed by said adder means when the output sample preceding the sample being processed was generated; and
   vi. means for inverting the content of said last storage means and adding the inverted content to the term provided by said adder means; and c. another adder means for adding together said main term and said corrective term provided by said first and second means, respectively, to provide a filtered output signal sample.

2. An electrical filter of the sampling type wherein each output signal sample is derived from a plurality of weighted earlier input signal samples, said filter characterized in that it includes:

a. a first means for forming a main term, said first means including:
   i. summing means for adding each signal sample fed to the input of the filter and the preceding input signal sample;
   ii. a first delay line;

iii. means for sequentially feeding the sums resulting from the operation performed by said summing means to said first delay line;
iv. readout means for providing the value of every second sum stored in said first delay line;
v. product means for weighting every second sum provided by said readout means, by alternatively using the values appearing at the readout means of even order to form a first output signal sample and the values appearing at the readout means of odd order to form a second output signal sample; and
vi. means for adding together the weighted sums;

b. a second means for forming a corrective term, said second means including:
i. a second delay line into which representations of the input signal samples applied to the filter are sequentially entered;
ii. taps on said second delay line to read out the representation of every second sample stored in said second delay line;
iii. multiplying means for weighting the representations of samples appearing at said taps, using a first set of constants selected from the filter coefficients;
iv. another adding means for adding together the values of the samples weighted by said multiplying means;
v. an inverter to generate the complement values of the output of said another adding means;
vi. gating circuits to apply a second set of constants selected from the filter coefficients to said weighting means during the time the other samples are present at said taps;
vii. a delay means to delay the inverted result of the operation performed by said another adding means until the time the output signal sample preceding the sample being processed is formed;
viii. summation means for completing said corrective term by adding together the results provided by said another adding means and said delay means; and c. third summing means for forming the desired output signal sample by adding said corrective term to said main term.

3. A device for forming samples $Y_i$ and $W_i$ of two signals Y and W derived from a sequence of samples of an input signal X through a first and a second filter, said filters having a first set, $a_1$–$a_n$, of coefficients for said first filter and a second set, $b_1$–$b_n$, of coefficients, for said second filter, respectively, characterized in that said device includes:

a. a first means for forming a main term, including:
i. summing means for adding the value of each sample of the input signal to the value of the preceding sample;
ii. value holding means for sequentially storing the output values provided by said summing means;
iii. readout means for providing the value of every second value stored by said summing means;
iv. multiplying means for weighting the values provided by said readout means with said coefficients $a_1$–$a_n$ belonging to said first set; and b. a second means for forming two corrective terms associated with said signals Y and W, respectively, said second means comprising;
i. storage means for sequentially storing the values of the samples of input signal X applied to the input;
ii. tap means for providing the value of every second sample stored by said storage means;
iii. a first corrector means for forming the sum $Y_i^1$ of the samples provided by said tap means by weighting said samples with the odd order coefficients of said second set and summing said weighted samples; and
iv. a second corrector means for forming the sum $W_{i+1}^2$ of the samples provided by said tap means by weighting said samples with the even order coefficients of said second set;

c. a third means for alternating the sets of coefficients used by said first and second means for forming a sample of said signal Y and said signal W;

d. a fourth means for storing the values provided by said second means, from the time a sample of Y and W is formed until the time the next sample is formed;

e. a fifth means for forming an output sample $Y_i$ by adding the value of the term $Y_i^2$ formed using the even order coefficients of said first set of coefficients, as stored by said fourth means, to the term $Y_i^1$ provided by said second means;

f. a sixth means for forming an output sample $W_i$ by subtracting said second corrector term obtained by using the coefficients in said second set, said term being provided by said fourth means, from the result obtained by subtracting the term $W_{i+1}^2$ from the main term $Z_i^{(w)}$; and g. seventh means for repeating the operations performed by said above means, by alternating the two sets of coefficients and the values of the terms of the Y and W forms while switching from the forming of samples $Y_i$ and $W_i$, to the forming of the next samples, namely, $Y_{i+1}$ and $W_{i+1}$.

* * * * *